(12) United States Patent
Dor

(10) Patent No.: US 6,234,113 B1
(45) Date of Patent: May 22, 2001

(54) SELF CLEANING AQUARIUM SYSTEM

(76) Inventor: Phillipe Alfred Dor, 22 Douglas Street, Cairns, 4870, Queensland (AU)

( * ) Notice: Subject to any disclaimer, the term of this patent is extended or adjusted under 35 U.S.C. 154(b) by 0 days.

(21) Appl. No.: 09/426,715

(22) Filed: Oct. 26, 1999

(30) Foreign Application Priority Data

Nov. 16, 1998 (AU) .................................................. PP7099

(51) Int. Cl.⁷ ............................................................. A01K 63/04
(52) U.S. Cl. ................................................. 119/259; 119/245
(58) Field of Search .................................... 119/259, 245, 119/260, 261, 262, 264, 269; 210/169, 167

(56) References Cited

U.S. PATENT DOCUMENTS

| | | |
|---|---|---|
| 3,759,223 * | 9/1973 | D'Andrea ............................. 119/259 |
| 3,785,342 | 1/1974 | Rogers . |
| 4,754,571 | 7/1988 | Riechmann . |
| 4,995,980 | 2/1991 | Jaubert . |
| 5,626,747 * | 5/1997 | Ritzow et al. ........................ 210/169 |
| 5,690,054 | 11/1997 | Allen . |
| 6,117,313 * | 9/2000 | Goldman et al. ..................... 210/151 |

FOREIGN PATENT DOCUMENTS

| | | |
|---|---|---|
| 28583/95 | 8/1995 | (AU) . |
| 539208 | 12/1931 | (DE) . |

* cited by examiner

Primary Examiner—Charles T. Jordan
Assistant Examiner—Judith A. Nelson
(74) Attorney, Agent, or Firm—Hoffman, Wasson & Gitler

(57) ABSTRACT

An aquarium system is disclosed having at least one sump with an outlet for draining water from the sump. A filter medium containing cavity for a filter medium is located above the sump and a catchment zone is located adjacent to and separated from the cavity by a separating wall. An aspiration conduit extends upwardly in the zone and communicates with the sump. When water is drained from the system, water remains in the zone up to a level defined by the separating wall.

12 Claims, 5 Drawing Sheets

# SELF CLEANING AQUARIUM SYSTEM

FIELD OF INVENTION

This invention relates to an aquarium system. In particular, the invention concerns a self cleaning aquarium system.

BACKGROUND OF THE INVENTION

U.S. Pat. No. 3,785,342 discloses a self cleaning aquarium having a water tank extending over the floor of the tank with a perforated plate extending over the drainage plate. An aggregate material is deposited onto the perforated plate. Water is piped from the drainage plate to a filter located externally of the tank and filtered water from the filter is returned into the tank.

U.S. Pat. No. 5,690,054 discloses an aquarium system consisting of a tank with flanges which support an under gravel filter with side inlet holes and a cleanout. The floor of the tank is shaped to provide one or more depressed areas into which waste is directed by gravity and water flow and from which a drain system allows the waste and stale water to be removed without the need for vacuuming. A filter tower extends upwardly from the filter and returns filtered water into the tank.

Australian Patent 28583/95 discloses an integrated under gravel filter for an aquarium which in many respects is similar to the arrangement illustrated and described in U.S. Pat. No. 3,785,342.

U.S. Pat. No. 4,995,980 discloses an arrangement for biological purification of water in which water within a tank is separated into a space above and a space below a partition. The partition consists of sand or gravel sandwiched between two screens. A diffuser aerates and agitates the water in the space above the partition. The water below the partition has a low oxygen content and has above it a layer supersaturated in oxygen occupied by microalgae and aerobic microorganisms.

With all of these known systems it is periodically necessary to completely drain the tank and clean the filter and/or aggregate material and then refill the tank with clean water. When the tank is drained for cleaning purposes the fish or life forms in the tank need to be removed. This is tedious and may lead to injury to the fish or other life forms in the tank.

SUMMARY OF THE INVENTION

It is an object of the present invention to at least minimize the disadvantages referred to above.

According to one aspect of the invention, there is provided an aquarium system including at least one sump with an outlet through which water may be drained from the sump a cavity for containing a filter medium located above the sump, a catchment zone adjacent the filter medium containing cavity and separated from the cavity by an upstanding wall, at least one aspiration conduit communicating with the sump and having an outlet above the height of the separating wall whereby, when water is drained form a tank having the system coupled to it or integrally formed with it, water remains in the catchment zone up to a level defined by at least the separating wall.

The aquarium system may be integrally formed with a tank and form the base of a tank. Alternatively, the system may receive a peripheral wall of a tank from which the base wall has been removed and the system may act as a stand for the peripheral wall and provide the base wall to complete the tank.

The outlet from the sump may include a valve which may be moved between an open and a closed position. Preferably, the sump has sloping side walls.

A pump may be associated with the aspiration conduit and may be located at one end of the conduit and has an outlet above the separating wall.

Preferably, the aquarium system has two sumps located adjacent one another and a cavity for filter medium is located above each sump. The filter medium cavities may be separated from one another by a partition. The partition may extend to a height corresponding to the height of the separating wall between the catchment zone, from one or the filter medium cavities.

Where the system has two sumps, each of them is provided with a drain outlet. The two sumps are preferably interconnected with each other. A connecting conduit may be provided for this purpose. The sumps may be in continuous communication. Alternatively, the connecting conduit may have a valve which is operable between an open and a closed position to allow the communicating connection between the sumps to be shut off.

Particular preferred embodiments of the invention will now be described by way of example with reference to the drawings accompany.

DETAILED DESCRIPTION

Figure 1:
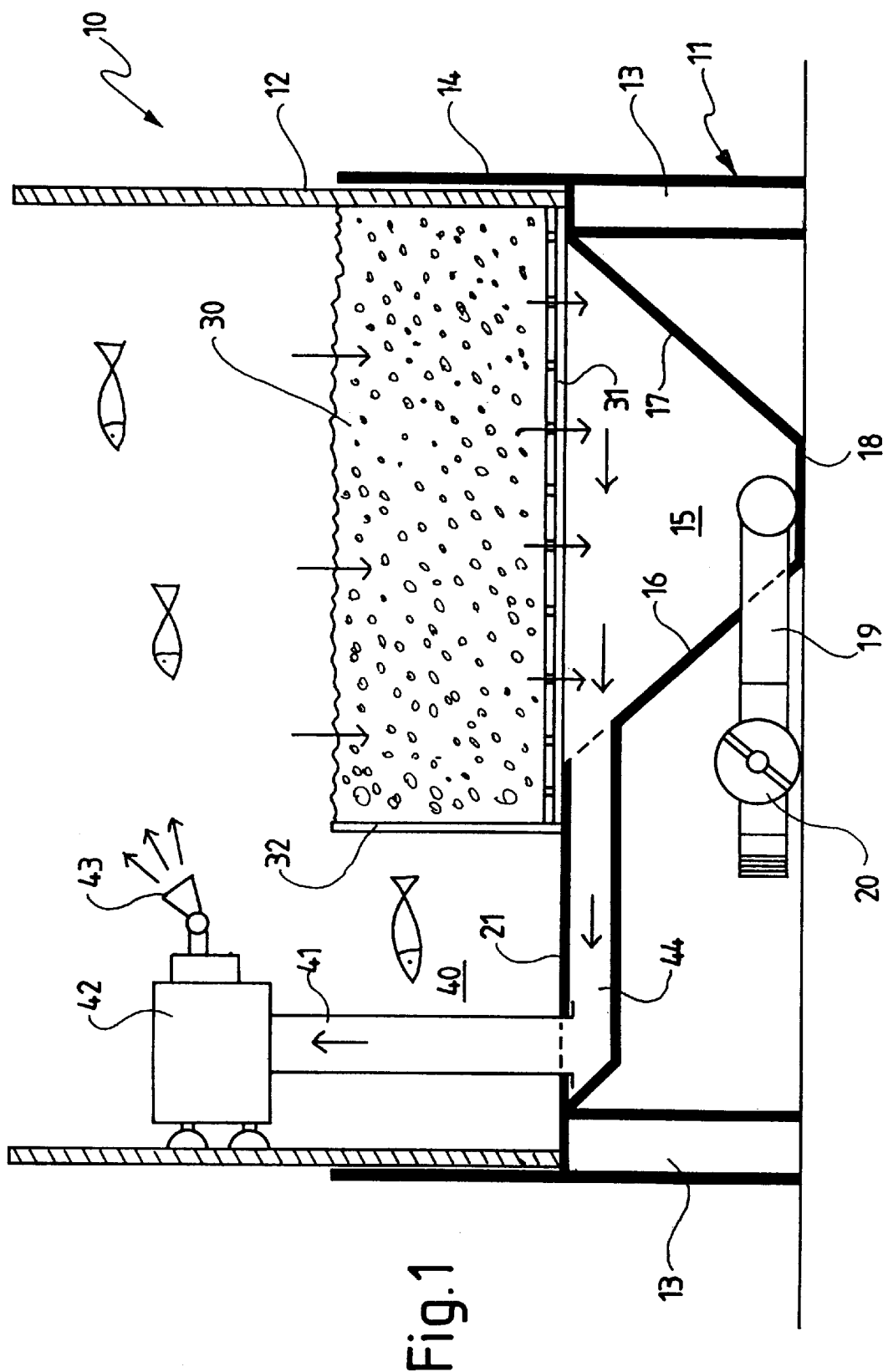
FIG. 1 is a side view of an aquarium system according to an embodiment of the invention.
Figure 2:
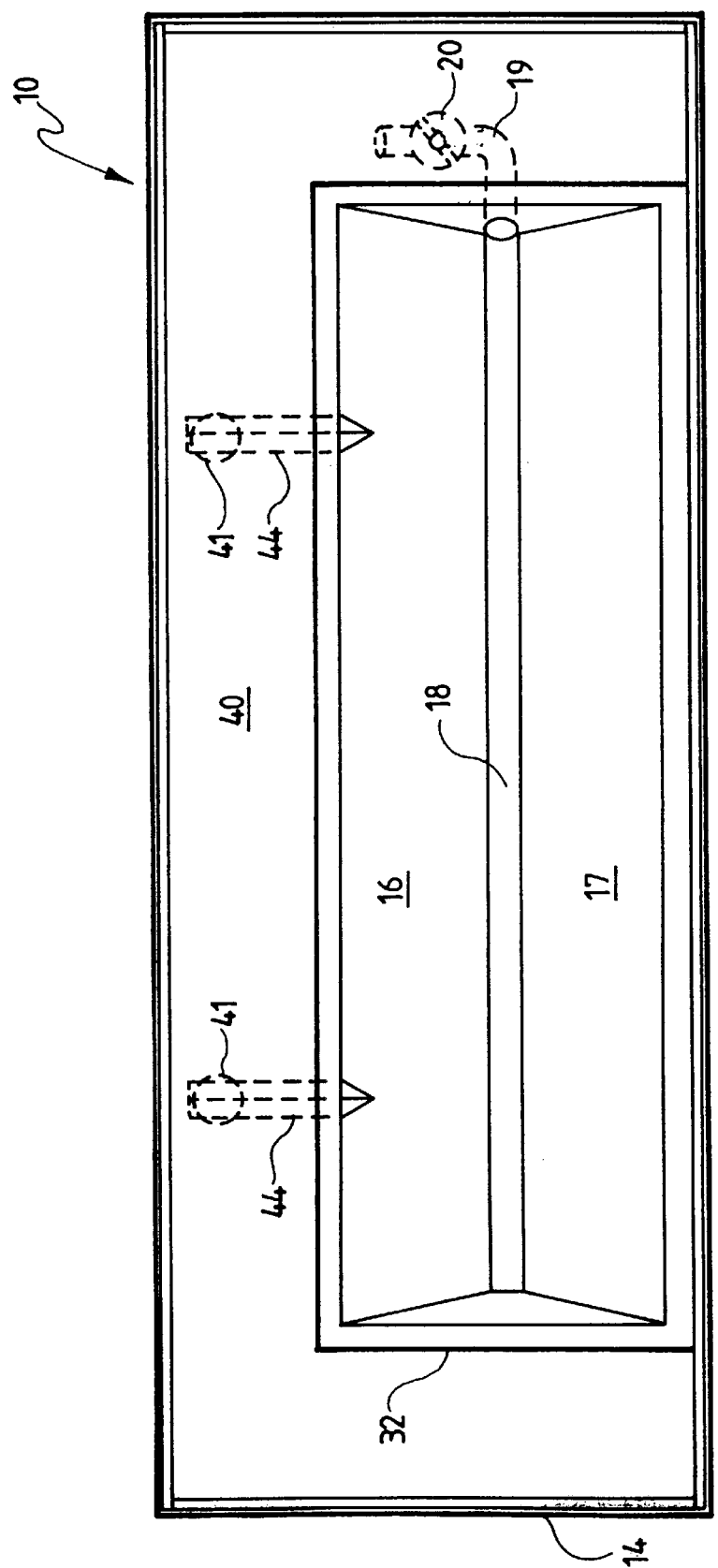
FIG. 2 is a plan view of the system of FIG. 1.
Figure 3:
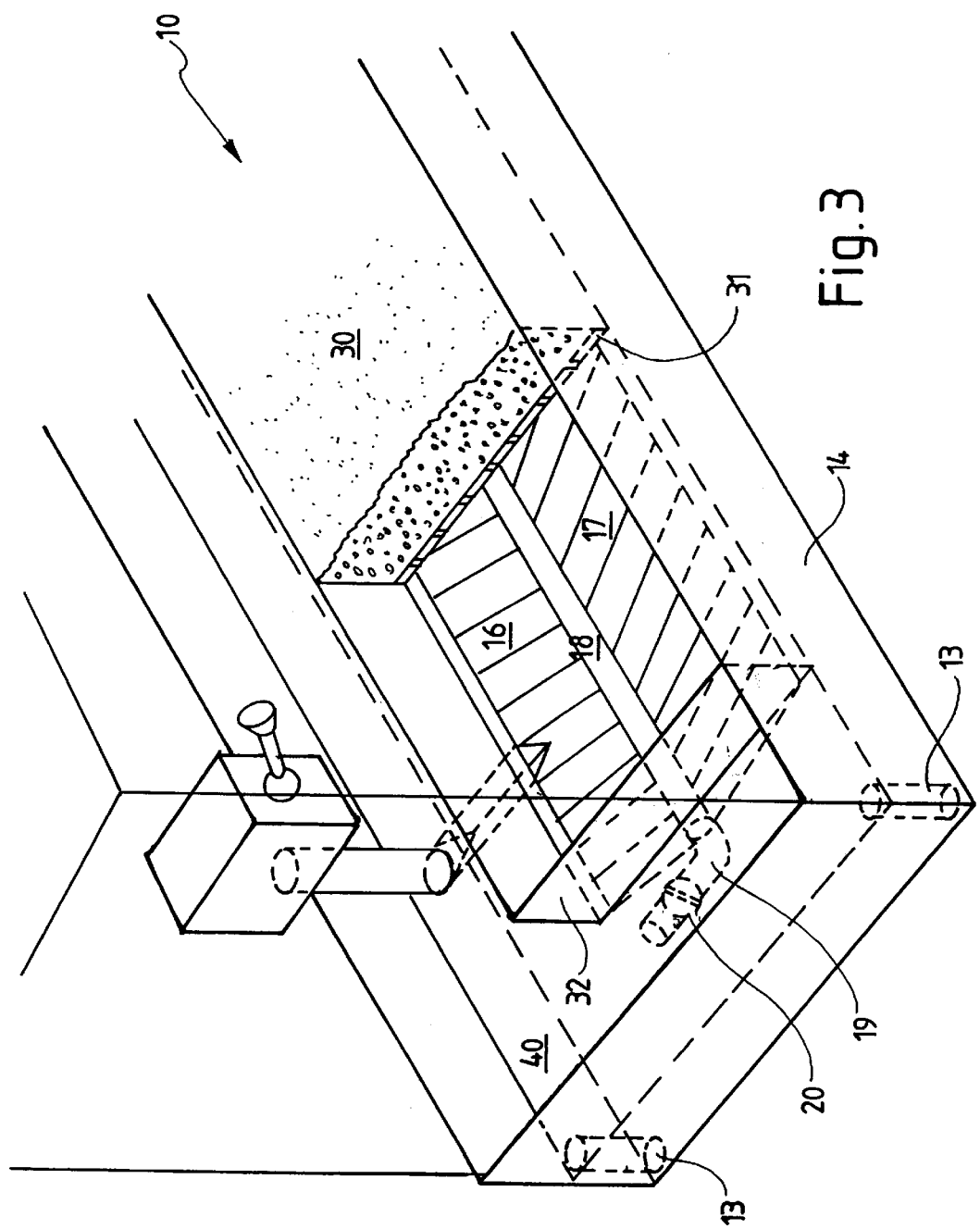
FIG. 3 is a partial perspective view of the system of FIG. 1.

FIGS. 1 to 3 illustrate an aquarium system 10. The system provides a base 11 for receiving glass walls 12 which form a space which may be filled with water and fish. The base has legs 13 and upstanding peripheral walls 14. A sump 15 is provided between the legs 13 and has sloping side walls 16, 17 and a base wall 18. Outlet 19 allows water to be drained from the sump. A valve 20 is present in the outlet. Valve 20 is opened when it is desired to drain water from the sump and from the tank defined by the glass wall 12 and surface 21 of the system 10.

A filter medium 30 is received within a cavity defined by a perforated base plate 31, glass wall 12 and wall 32.

A catchment zone 40 is defined by glass wall 14, the wall 32 and surface 21. Two aspiration conduits 41 extend upwardly from the surface 21 and terminates above the height of the wall 32. Pumps 42 (only one is shown) with any outlet 43 is located at the end of conduit 41. Passages 44 allow the conduit to communicate with the sump 15.

In use, the system 10 is filled with water and stocked with fish. The valve 20 is closed and the pump 42 draws water through the filter, into the sump 15, through passage 44, along conduit 41 and then is returned into the tank. When periodic cleaning of the system is desired, the pump may be turned off. Valve 20 is opened and water is drained from the system to remove the water from the filter and the sump. Water remains in the catchment zone which then functions as a refuge for fish during cleaning of the filter medium 30. Once the filter medium is no longer submerged, a quick energetic flush of the medium will eliminate most detritus trapped in the medium and the deep sump allows fast removal of dirty water. Once the flushing action is completed, the valve 20 may be closed and the system refilled.

Figure 4:
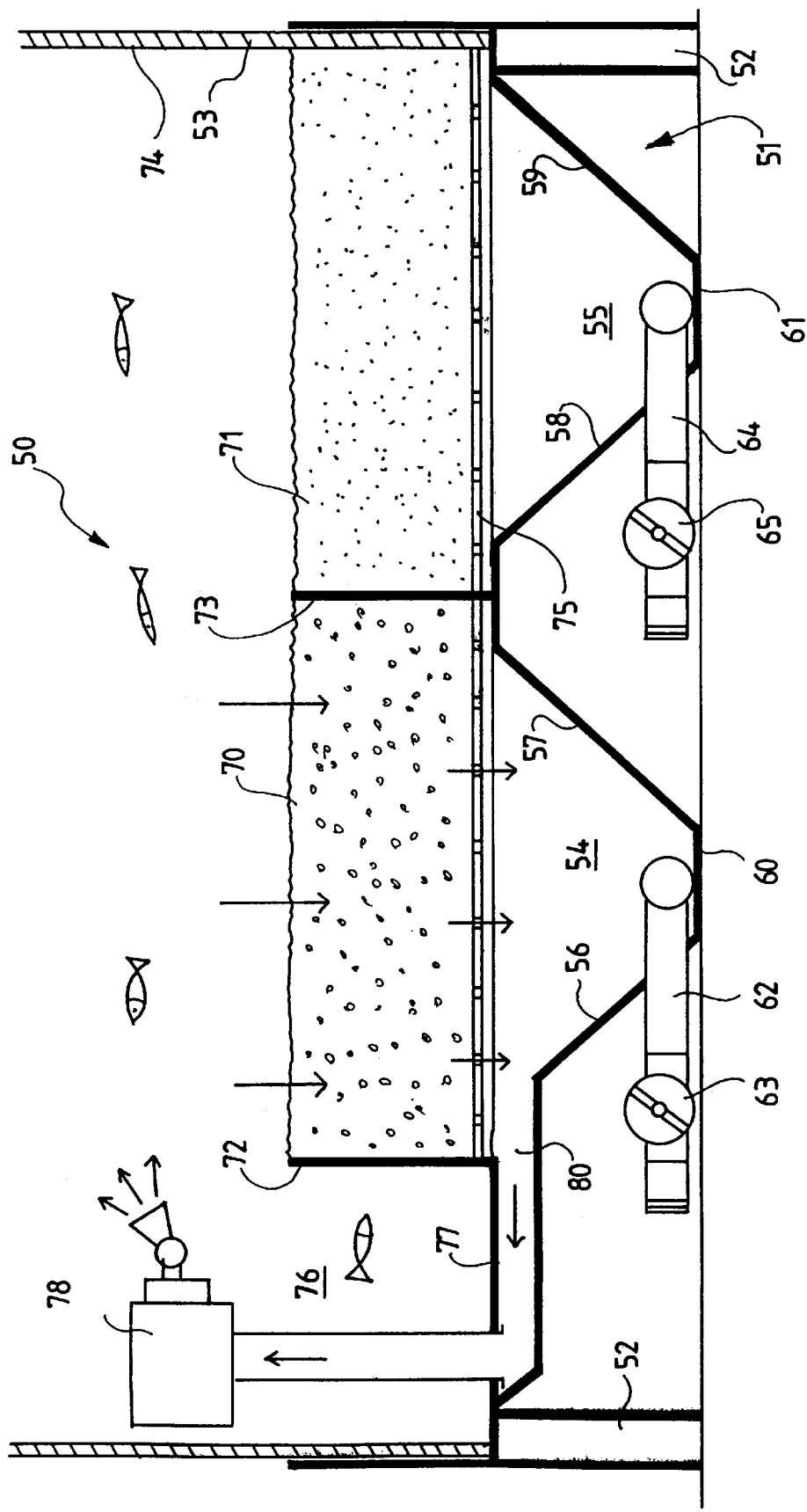
FIG. 4 is a side view of an aquarium system according to a second embodiment of the invention.
Figure 5:
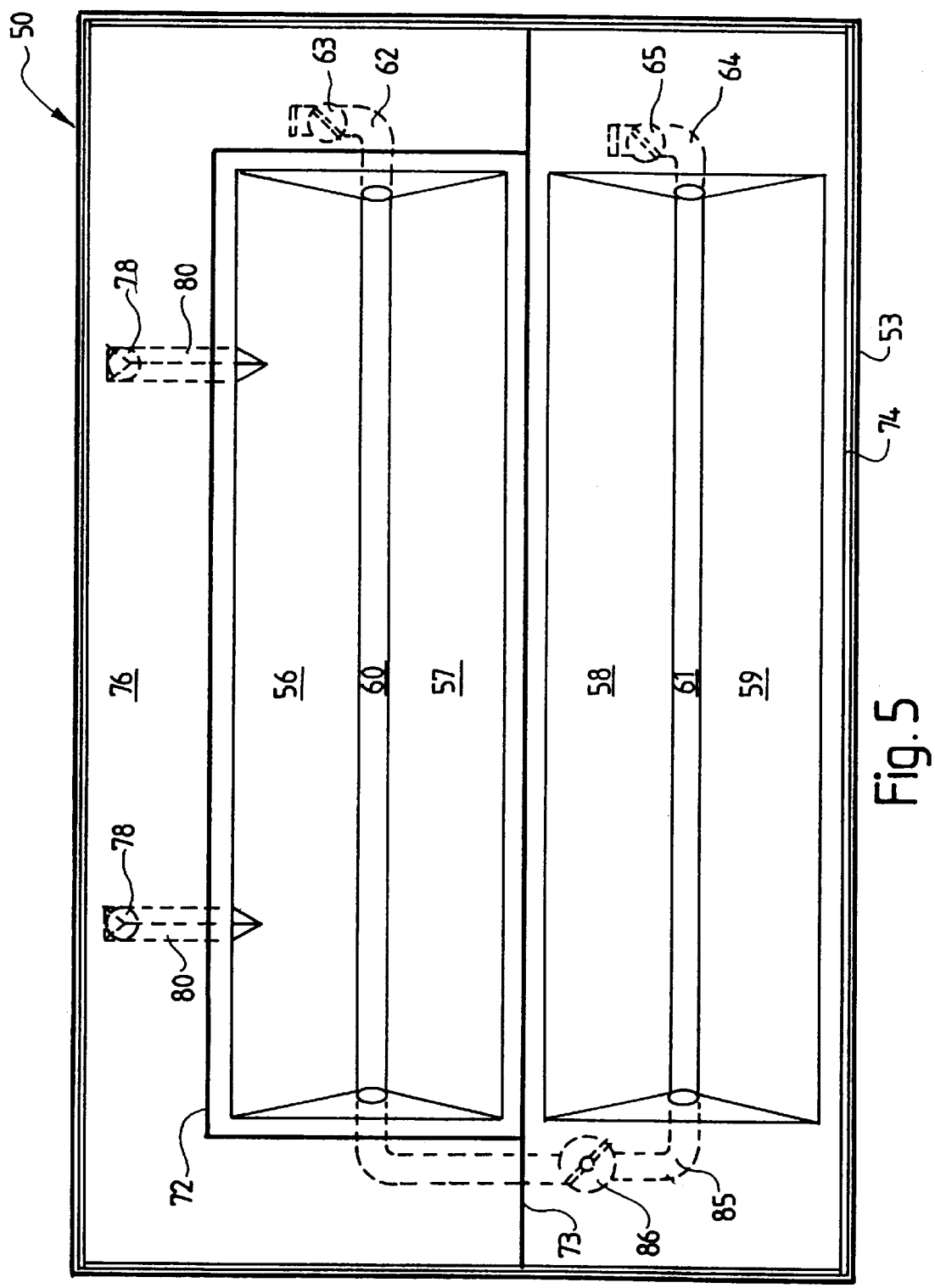
FIG. 5 is a plan view of the system shown in FIG. 4.

FIGS. 4 and 5 illustrate a second embodiment of the invention. The system 50 has a base 51 with legs 52 and an upstanding peripheral wall 53. Two sumps 54, 55 are provided between the legs 52 and have sloping side walls 56, 57 and 58, 59 and have base walls 60, 61. Sump 54 has an outlet 62 with a valve 63 while sump 55 has an outlet 64 with a valve 65. The outlets allow water to be drained from the sumps.

Filter mediums 70, 71 are received within respective cavities defined by walls 72, 73 surrounding upstanding glass wall 74 and perforated base plate 75. A shaped catchment zone 76 is defined by glass wall 74, wall 72 and surface 77. Aspiration conduits 78 extend through the surface 77 and terminate in a pump 79 with outlets above the height of the wall 72. Passages 80 allow the sump 54 to communicate with the conduits 78. Conduit 85 with valve 86 allow the two sumps to communicate with each other.

The system of FIGS. 4 and 5 operates in a similar fashion to the system of FIGS. 1 and 3 except that two different filter mediums may be used. To drain the system valves 63 and 65 are opened and the water in the sump and above the filter mediums is drained away. Water remains in the zone 76 which provides a refuse for the fish. The mediums 70, 71 may be rigorously flushed and the valves 63, 65 may then be closed and the system refilled with water.

What is claimed is:

1. An aquarium system including at least one sump with an outlet through which water may be drained from the sump, a cavity for containing a filter medium located above the sump, a catchment zone adjacent the filter medium containing cavity and separated from the cavity by an upstanding wall, at least one aspiration conduit communicating with the sump and having an outlet above the height of the separating wall whereby, when water is drained from a tank having the system coupled to it or integrally formed with it, water remains in the catchment zone up to a level defined by at least the separating wall.

2. The system of claim 1 wherein the tank is provided in part by an upstanding peripheral wall either integrally formed with or coupled to the system.

3. The system of claim 1 including two said sumps located adjacent one another with each said sump having a respective said outlet through which water may be drained from the sumps.

4. The system of claim 3 wherein each said outlet includes a valve moveable between an open and a closed position.

5. The system of claim 3 including a conduit for interconnecting the two sumps.

6. The system of claim 1 including at least one passage extending between the sump and the aspiration conduit.

7. The system of claim 1 including two spaced said aspiration conduits and a respective said passage extending between each said conduit and the sump.

8. The system of claim 1 wherein each said sump has downwardly sloping side walls.

9. The system of claim 1 including a perforated plate in the filter medium cavity separating the cavity from the or each said sump.

10. The system of claim 1 including legs providing a base for the system.

11. The system of claim 6 including a pump coupled to an end of the conduit.

12. The system of claim 7 including a respective said pump coupled to an end of said conduit.

* * * * *